United States Patent [19]
Lücke et al.

[11] Patent Number: 5,748,367
[45] Date of Patent: May 5, 1998

[54] ILLUMINATING DEVICE FOR A STEREO MICROSCOPE

[75] Inventors: Christian Lücke; Gunther Sümmerer; Hartmut Gärtner, all of Oberkochen, Germany

[73] Assignee: Carl-Zeiss-Stiftung, Heidenheim, Germany

[21] Appl. No.: 544,794

[22] Filed: Oct. 18, 1995

[30] Foreign Application Priority Data

Oct. 13, 1994 [DE] Germany ............... 44 36 575.6

[51] Int. Cl.⁶ .................... G02B 21/06; G02B 21/00; G02B 21/20; G02B 15/14
[52] U.S. Cl. .................... 359/385; 359/387; 359/388; 359/684; 359/375; 359/376; 359/381; 359/382; 359/383
[58] Field of Search ............... 359/385, 387, 359/388, 390, 389, 771, 772, 773, 774, 694, 696, 686, 747, 684, 381, 382, 383, 375, 376

[56] References Cited

U.S. PATENT DOCUMENTS

| | | | |
|---|---|---|---|
| 3,669,524 | 6/1972 | Shio | 359/385 |
| 4,232,933 | 11/1980 | Nakahashi | 359/385 |
| 4,312,559 | 1/1982 | Kojima et al. | 359/385 |
| 4,448,498 | 5/1984 | Muller et al. | 359/385 |
| 4,724,319 | 2/1988 | Shirota | 250/307 |
| 4,998,810 | 3/1991 | Sander et al. | 359/389 |
| 5,532,873 | 7/1996 | Dixon | 359/388 |

FOREIGN PATENT DOCUMENTS

| | | | |
|---|---|---|---|
| 0321586 | 6/1989 | European Pat. Off. | |
| 290278 | 5/1991 | German Dem. Rep. | 359/375 |
| 2713356 | 4/1988 | Germany | |
| 8713356 | 4/1988 | Germany | |
| 9003458 | 5/1990 | Germany | |
| 4231469 | 3/1994 | Germany | 359/390 |
| 4243488 | 6/1994 | Germany | 359/385 |
| 133427 | 8/1982 | Japan | 359/385 |
| 161804 | 10/1982 | Japan | 359/684 |
| 242416 | 12/1985 | Japan | 359/774 |
| 675776 | 10/1990 | Switzerland | 359/390 |

OTHER PUBLICATIONS

The Above Documents are Discussed in Applicant's Specification.

*Primary Examiner*—Paul M. Dzierzynski
*Assistant Examiner*—Mohammad Y. Sikder

[57] ABSTRACT

An illuminating device for a stereo microscope having an objective with variable imaging focal intercept includes first coupling mechanism, which effects a coupling between the imaging focal intercept of the objective and the likewise adjustable focal intercept of the illuminating optical system, separate from the observation optics, in such a manner that the illuminating focal intercept is in agreement with the imaging focal intercept of the objective. Moreover, adjusting mechanism is provided for the defined adjustment of the diameter of the illuminated field. In particular, the illuminating device is suitable for a surgical microscope.

13 Claims, 4 Drawing Sheets

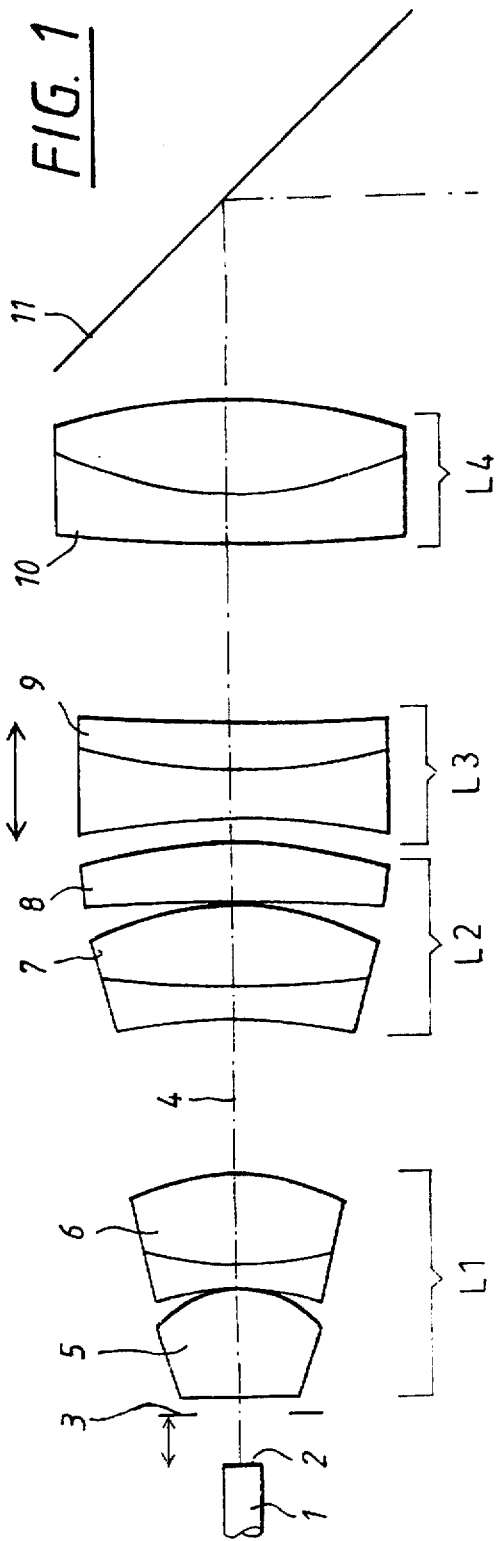
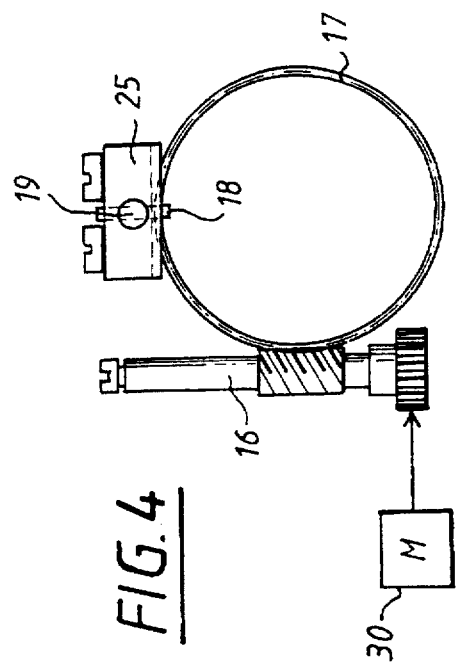

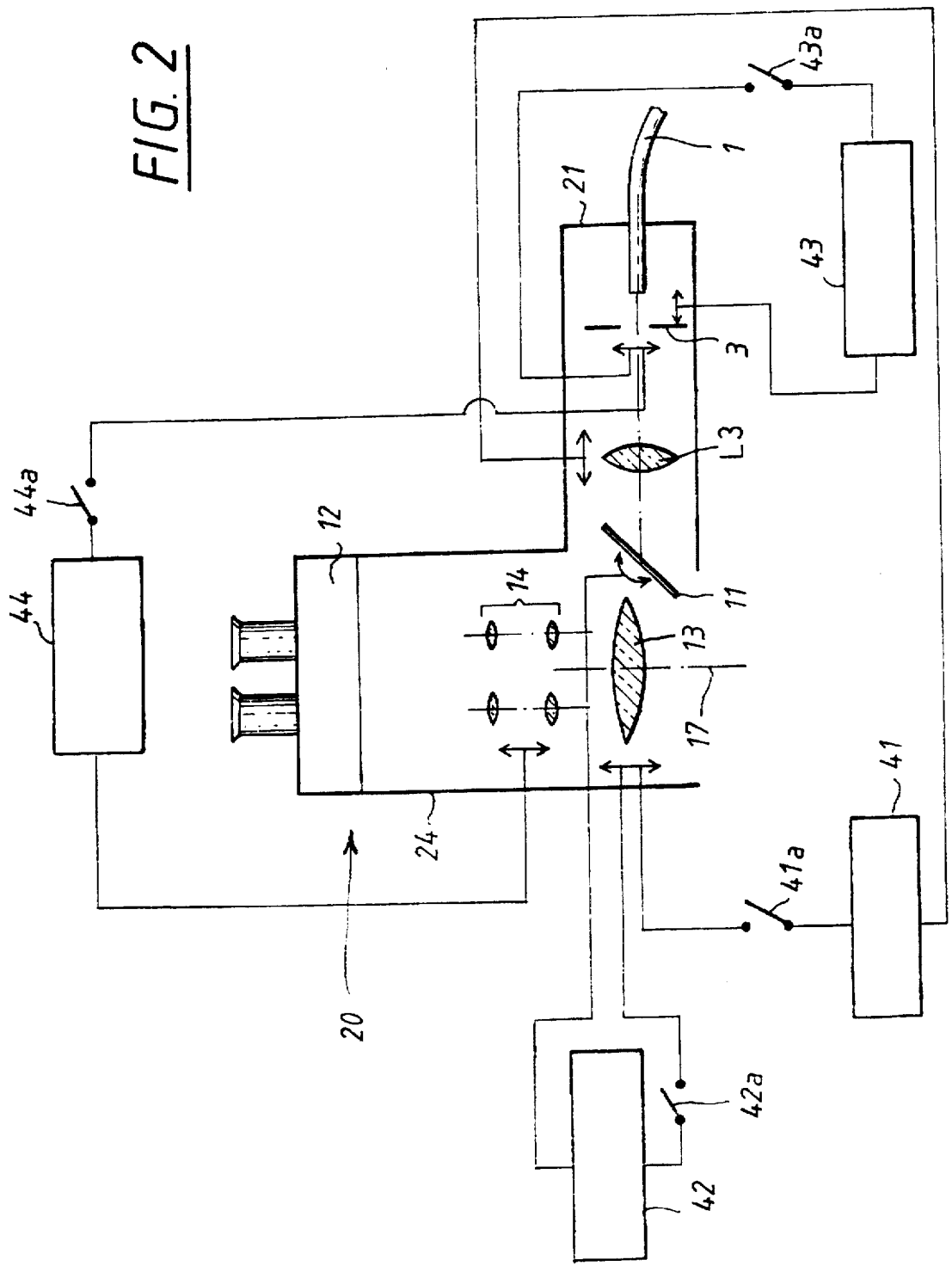

ic focal intercept is used, as is known, for example, from the German Utility Model G 90 16 892.5, the focal intercepts of the illuminating device and the imaging focal intercept of the objective are not always in agreement. The illuminating device known from U.S. Pat. No. 4,998,810 thus cannot be used in combination with an objective having a variable imaging focal intercept.

5,748,367

1
ILLUMINATING DEVICE FOR A STEREO MICROSCOPE

BACKGROUND OF THE INVENTION

1. Field of the Invention

The present invention relates to an illuminating device for a stereo microscope having an objective of variable imaging focal intercept, with which device a variation of illuminating focal intercepts is possible by means of an optical system which is separate from the observation optics.

2. Discussion of Prior Art

An illuminating device for a stereo microscope designed as a surgical microscope, with a main objective of fixed imaging focal intercept, is known from U.S. Pat. No. 4,998, 810. The illuminating device makes possible the selective setting of the desired illuminated field diameter in the object plane. The illuminating device has a separate optical system which is independent of the observation optics. The optical system effects an independent imaging of the illuminated field diaphragm by means of a deflecting element arranged beneath the objective; that is, the illuminating beam path is not imaged by means of the objective of the observation beam path.

The optical system of this known illuminating device is designed for a fixed imaging focal intercept of the main objective of the corresponding stereo microscope. This means that when an objective having a variable imaging focal intercept is used, as is known, for example, from the German Utility Model G 90 16 892.5, the focal intercepts of the illuminating device and the imaging focal intercept of the objective are not always in agreement. The illuminating device known from U.S. Pat. No. 4,998,810 thus cannot be used in combination with an objective having a variable imaging focal intercept.

This problem basically arises when the illuminating beam path is not imaged in the relevant object plane by the objective of the observation beam path, but a separate optical system is provided for this purpose.

SUMMARY OF THE INVENTION

The object of the present invention is therefore to provide an illuminating device, for a stereo microscope having an objective of variable imaging focal intercept, in which an optical system, separate from the observation optics, is provided for the illuminating beam path. It is to be always ensured that there is agreement between the imaging focal intercept and the focal intercept of the illuminating device. It should be understood that as used in this specification the term imaging focal intercept refers to the distance between the object and the surface of the lens nearest the object. The term illumination focal intercept refers to the distance between the image of a illuminated field diaphragm or a light source and the surface of the lens of the illuminating optics nearest to said image. Furthermore, an illumination which is always optimized without troublesome adjustments is to be provided for the user. It is furthermore desirable that the illuminated field diameter in the object plane be adjustable.

This object is attained by means of an illuminating device for a stereo microscope having imaging optics including an objective with variable imaging focal intercepts comprising an optical system separate from the imaging optics for providing an illumination focal intercept variation, and a first coupling means which effects a coupling between the imaging focal intercept of the objective and the illuminating focal intercept such that the illuminating focal intercept is in

2 agreement with the imaging focal intercept of the objective. An illuminating device according to the invention is provided in combination with a stereo microscope.

The illuminating device according to the invention ensures, due to the first coupling means that the illuminating focal intercept is always in agreement with the imaging focal intercept of the objective used. The focusing of the illuminated field diaphragm arranged in the illuminating beam path consequently always takes place in the respective object plane which has just been brought into focus by means of the objective of variable focal intercept.

It can moreover be ensured by means of second coupling means that the angular position of a deflecting element of the illuminating device is altered, in dependence on the respective imaging and illuminating focal intercepts, such that there always results a centered illumination of the visual field being examined. The illuminating device according to the invention moreover advantageously has an adjusting means which can be actuated by the user for adjusting, in a defined manner, the illuminated field diameter in the object plane. The observer is thereby able to optimally illuminate even places which lie deeper in the visual field, if a somewhat smaller illuminated field diameter is required for this purpose. This is, for example, an advantage when the stereo microscope with the illuminating device according to the invention is used as an operation microscope in neurosurgery and deep body cavities are to be illuminated in this case.

In connection with the adjusting means, it can be ensured by a third coupling means that the highest possible amount of light is available within a given surface area. If at higher magnifications the illuminating light is automatically concentrated on a smaller region, an improved contrast results for the observer, since scattered light from other regions of the operation field is stopped out.

When adjusting the desired illuminated field diameter by means of the adjusting means, the position of a fiber optic light guide is simultaneously varied for this purpose in a defined manner relative to the illuminated field diameter provided. The adjustment of the illuminating field diameter here preferably takes place by varying the diameter of the illuminated field diaphragm.

A fourth coupling means, like the coupling means mentioned above, can moreover be optionally provided within a stereo microscope in connection with the illuminating device according to the invention, and can effect a variation in a defined manner of the illuminated field diameter in dependence on the present magnification of a pancratic magnifying system. An automated matching of brightness can thus be ensured for different magnifications in the stereoscopic observation beam paths. A constant intensity of illumination in the exit pupils of the stereoscopic observation beam paths is sought by means of this coupling.

In particular, illuminating properties which are always optimized for the operating surgeon thus result in a surgical microscope in which the illuminating device according to the invention is used; with the exception of the manual adjustability of the illuminated field diameter, all the coupling functions occur in an automated manner by means of various coupling means when the respective coupling is activated.

Besides the embodiments of the respective coupling means described herein below, the use of alternative coupling means is also possible according to the invention, such as, for example, a variant, designed completely for operation by electric motors, in which all the adjusting movements take place by means of suitable drive units with which corresponding encoders are associated. The encoder signals are then evaluated by a central control unit which generates, based on the encoder data, corresponding control signals for the drive unit.

It is in addition also possible in all the embodiments, however, to selectively switch off individual ones of the coupling functions mentioned, and to engage only certain of the coupling functions.

DESCRIPTION OF THE DRAWINGS

Further advantages and also details of the illuminating device according to the invention are set forth in the following description with reference to the accompanying drawings, in which:

FIG. 1: shows a section through the optical system of an embodiment of the illuminating device according to the invention;

FIG. 2: shows a schematized illustration of a stereo microscope with the illuminating device according to the invention, with all the possible couplings;

FIG. 4: shows a first cross section through the illuminating device of FIG. 3;

FIG. 5b: shows an enlarged illustration of a portion of the illumination device from FIG. 5a;

DETAILED DESCRIPTION OF PREFERRED EMBODIMENTS

Figure 3:
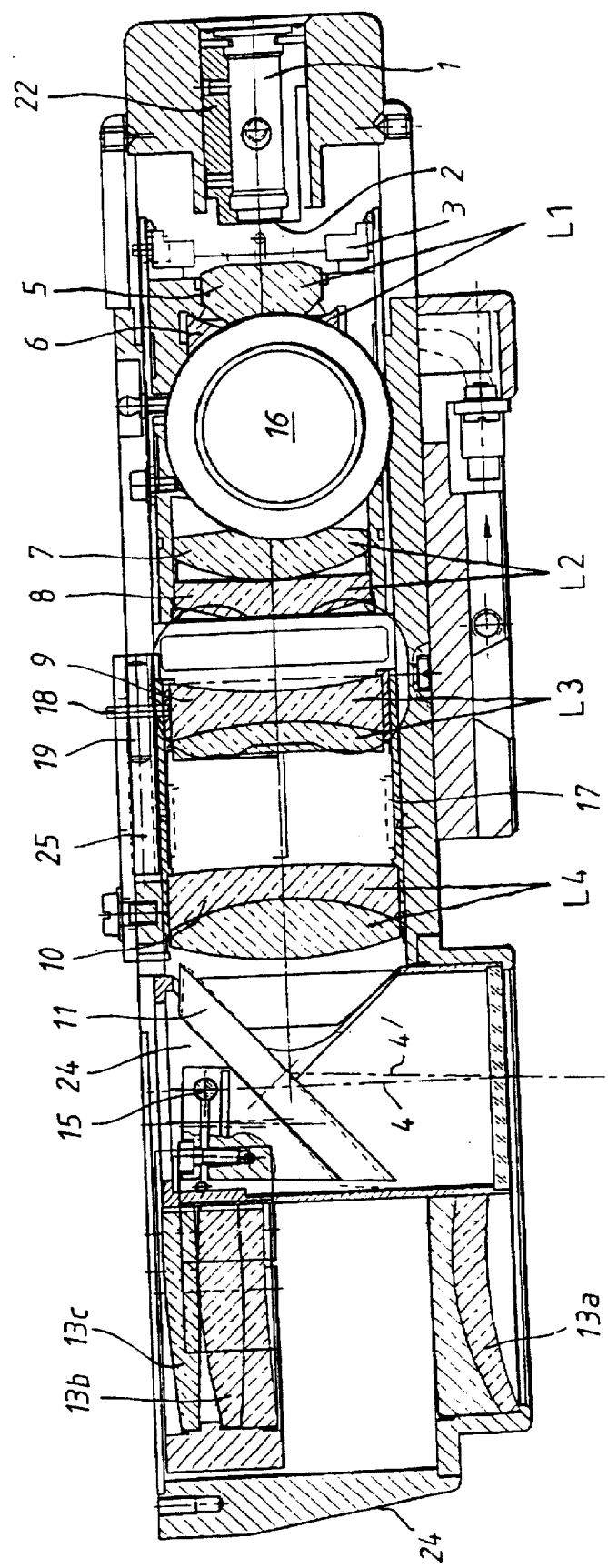
FIG. 3: shows a longitudinal section through an embodiment of the illuminating device according to the invention, arranged beneath the objective of a stereo microscope.

A section through the optical system of an embodiment of the illuminating device according to the invention is shown in FIG. 1. The optical system includes a fiber optic light guide (1), into which light of a suitable or desired light source is coupled at the entry side, such as, for example, a metal oxide vaporized mirror lamp or a Cermax xenon lamp. The coupling-in side is not shown in FIG. 1.

A illuminated field diaphragm (3) is arranged in front of the exit face (2) of the fiber optic light guide (1), and is illuminated by the fiber optic light guide (1). The illuminated field diaphragm (3) is preferably an iris diaphragm, and can be adjusted in diameter in a defined manner by means of suitable adjusting means, so that it is thus possible for the user to set a desired illuminated field diameter in the object plane being examined.

In an embodiment of the illuminating device according to the invention, there is a provision for coupling the opening movement of the iris diaphragm in a defined manner to a variation of the relative distance between the exit face (2) of the light guide and the iris diaphragm, by means of certain coupling means, which is denoted herein below by "third coupling means". It is also ensured that the maximum possible light energy per unit surface is available in the illuminated field, even at different settings of the illuminated field diameter. In the case of the diminution of the illuminated field diameter, the relative distance between the illuminated field diaphragm (3) and the exit face (2) of the light guide is correspondingly diminished. The variation of the relative distance can take place by a displacement of the fiber optic light guide (1), or else of the illuminated field diaphragm (3) arranged in front of it, including the first two optical elements (L1, L2) which follow in the illumination beam path. These two possibilities for the variation of the relative distance are indicated by the arrow between the light guide (1) and the illuminated field diaphragm (3).

Following the illuminated field diaphragm (3) in the direction of beam propagation along the optical axis (4) are four separate lenses or lens groups (L1, L2, L3, L4). The first lens group (L1) consists in the embodiment shown of a first lens (5) with a converging optical action and also a two-part cemented element (6), likewise with converging optical action. The second lens group (L2) includes a two-part cemented element (7) with converging optical action and, arranged immediately adjacent, a further lens (8), likewise with converging optical action. The third lens group (L3) consists, in the embodiment shown, of a lens (9) with diverging optical action, and is embodied as a two-part cemented element. Finally, a single lens (10) of the fourth lens group (L4) follows the third lens group (L3), and is embodied as a two-part cemented element with converging optical action.

Imaging of the illuminated field diaphragm (3) to "infinity" takes place by means of the first and second lens groups (L1, L2) that is, a parallel illuminating beam path is present after these two lens groups (L1, L2). The parallel illuminating beam path is then focused in the desired object plane by means of the third and fourth lens groups (L3, L4). The desired variation of the illuminating focal intercept takes place by the displacement of the third lens group (L3) along the optical axis (4).

The optical system of the illuminating device according to the invention moreover includes a deflecting element (11), by means of which the illuminating beam path is deflected in the direction of the object plane which is observed through the main objective. The deflecting element (11) is preferably embodied as a known deflecting mirror. The deflecting element (11) of the optical system is moreover arranged in the illuminating beam path such that illuminating light can thereby be deflected at different angles to the optical axis of the imaging beam paths, that is, preferably movable around at least one axis. Such a possibility of adjustment of the illuminating angle is requisite with variable illuminating or imaging focal intercepts, in order always to ensure a centered relationship between the visual field and the illuminating beam path. Details of this are more fully explained in the description herein below.

A schematized representation of a stereo microscope (20) with the illuminating device according to the invention is explained herein below with reference to FIG. 2. This also shows all the possible couplings which can be effected between different functions of the stereo microscope (20). The stereo microscope (20) is indicated here only schematically. In particular, the arrangement of the illuminating device relative to the binocular tube (12) or to the housing of the stereo microscope is not correctly shown in FIG. 2. The housing (21) with the illuminating device according to the invention is usually oriented opposed to the observer direction, that is, it is oriented in the direction of the plane of the drawing. The present illustration was selected solely for the purpose of better clarity.

The stereo microscope shown (20) includes, besides the illuminating device, the principle of which has already been described in FIG. 1, an objective (13) of variable focal intercept, a magnification changing device (14) which follows the objective (13), and also a likewise known binocular tube (12).

According to the invention, a first coupling means (41) is provided, to couple the variable imaging focal intercept of the objective (13) to the illuminating focal intercept in such a manner that the illuminating focal intercept is always in agreement with the imaging focal intercept of the objective (13). The variation of the imaging focal intercept of the objective takes place by the displacement of one or more objective lenses along the optical axis (17), as indicated by the corresponding arrow.

Moreover, a second coupling means (42) is also provided, which furthermore couples the imaging focal intercept of the objective (13) with the angular position of the deflecting element (11), which is mounted for movement around at least one axis, in the illuminating beam path. It is thereby ensured that a centered relationship is present between the visual field concerned and the illuminated field.

Furthermore, a suitable adjusting means is present in order to embody the illuminated field diaphragm with a diameter which can be varied by the user. The adjusting means is indicated in FIG. 2 only by the arrow shown near the illuminated field diaphragm (3).

Furthermore, a third coupling means (43) can couple the change of diameter of the illuminated field diaphragm (3), and thus the change of the illuminated field diameter, to the relative distance between the fiber optic light guide (1) and the illuminated field diaphragm (3). An always optimum illumination of the adjusted illuminated field, with the maximum possible light energy per unit surface, is thus ensured.

Finally, moreover, fourth coupling means (44) is provided, optionally as is the case for the previously described coupling means, and couples the illuminated field diameter, that is, the present set diameter of the illuminated field diaphragm (3), with the respective magnification of the magnification changing device (14). Optimum matching of brightness is thereby ensured in all possible stages of magnification.

All the coupling means which have been described can moreover be embodied, in a possible embodiment, to be switched off, that is, the user has the choice of having the respective coupling means activated or deactivated in the stereo microscope.

A description of a specific embodiment of the illuminating device according to the invention now follows, with reference to FIGS. 3, 4, and 5a–c. The elements already known from FIG. 1 are given the same reference numerals.

FIG. 3 shows a longitudinal section through an embodiment of the illuminating device arranged on the housing (24) of a stereo microscope. Apart from a portion of the housing (24) and the optical elements (13a, 13b, 13c) of the objective of variable focal intercept, no further details of the stereo microscope are shown here.

The objective of variable focal intercept which is used here corresponds to the objective from German Utility Model G 90 16 892.5, which is incorporated herein by reference. This includes a front negative element (13a) and also two optical elements (13b, 13c) with converging optical action, which can be displaced in a defined manner along the optical axis relative to the stationary negative element (13a), so that a variation of the imaging focal intercept is thereby possible in the range between 150 mm and 450 mm. The displacement of the two movable lenses (13b, 13c) takes place either by means of a suitable drive unit in the form of a stepping motor, which is not visible in this illustration, or else manually by means of a suitable operating knob.

The end of a fiber optic light guide (1), which is fixed by means of a suitable fastening device (22), can be recognized in the housing of the illuminating device according to the invention. The illuminated field diaphragm, embodied as an iris diaphragm (3), is arranged in front of the exit surface (2) of the light guide. The four lens groups (L1, L2, L3, L4) or optical elements are arranged in front of the iris diaphragm (3), as described for FIG. 1. The individual lenses (5, . . . , 10) of the different lens groups (L1, L2, L3, L4) correspond to those known from the embodiment of the optical system of the illuminating device shown in FIG. 1.

The deflecting element (11), embodied as a deflecting mirror, is arranged obliquely with respect to the objective, and follows the four lens groups (L1, L2, L3, L4) in the direction of propagation of the illuminating beam path. In the illustration of FIG. 3, a second possible position of the deflecting mirror (11) is shown dashed, and the corresponding altered position of the optical axis (4, 4') of the illuminating beam path is also delineated. The deflecting mirror (11) is for this purpose mounted for movement about an axis which is oriented perpendicular to the plane of the drawing. An alternative mounting of the deflecting element (11) can of course also be effected.

According to the invention, the illuminating device includes a first coupling means, which effects the coupling between the imaging focal intercept of the objective used with the illuminating focal intercept of the illuminating device used, so that it is always ensured that the imaging focal intercept of the objective and the illuminating focal intercept of the illuminating device are in agreement. For this purpose, in the illustrated embodiment, the vertical displacement movement of the two movable lenses (13b, 13c) of the objective is coupled to the horizontal displacement of the third lens group (L3), by means of which the focal intercept variation of the illuminating beam path takes place. The drive unit provided for the displacement of the movable objective elements (13b, 13c) is here also used to convert the drive movement of the movable objective elements (13b, 13c) into a linear movement of the third lens element (L3).

For this purpose, the drive unit (30), shown schematically in FIG. 4, drives a worm (16), which furthermore displaces in a rotary motion a worm wheel (17) in contact with it. A vertically arranged guide pin (18) engages in a control cam in the worm wheel (17) and is connected to the movable lens group (L3) or to its mounting within the worm wheel (17). The movable lens group (L3) of the illuminating device thereby move, when there is a rotary motion of the worm wheel (17) in the axial direction within the required range of displacement by means of a further guide pin (19), precisely stabilized in a guide (25). Thus, the coupling according to the invention between the different focal intercepts can be adjusted by the suitable choice of gear reduction ratios, control cam pitch, and the like.

Moreover, a second coupling means is provided within the illuminating device according to the invention, and varies the angular position of the deflecting element (11) about a defined axis (15) in dependence on the respectively set imaging focal intercept of the objective, such that the desired centered relationship between the visual field and the illuminated field always exists in the object plane. A lever mechanism, not shown in FIG. 3, is provided for this purpose, and couples the displaceable optical elements (13b, 13c) of the objective with the mirror mounting (24) of the deflecting mirror in such a manner that the desired, spatially defined, relationship between the middle of the visual field and the illuminated field always remains ensured.

Besides this, adjusting means for a defined setting of the illuminated field diameter in the object plane is provided in the embodiment shown. The adjusting means include the rotary knob (16) which can also be seen in FIG. 3 and by means of which the opening of the iris diaphragm can be displaced in a defined manner by the user. The displacement mechanism of the iris diaphragm (3) is explained herein below with reference to FIGS. 5a–5c.

Figure 5A:
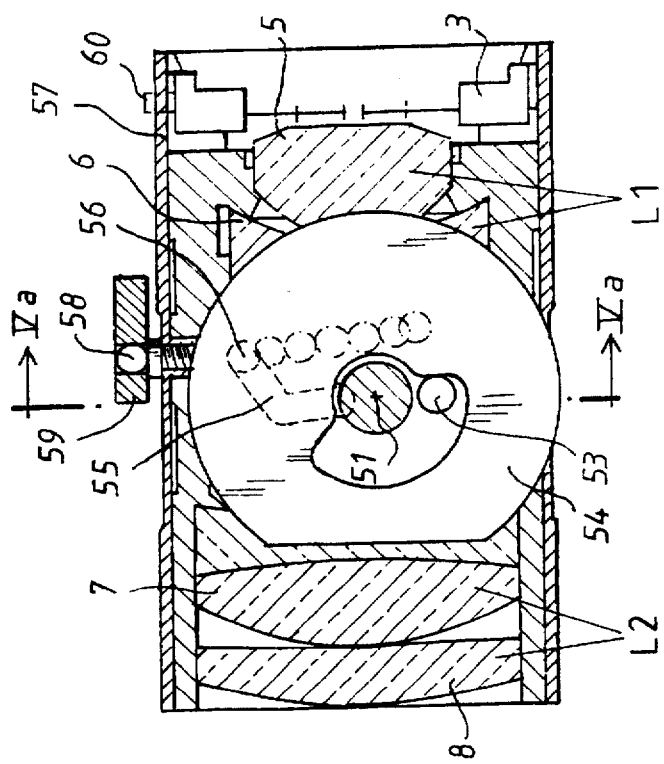
FIG. 5a: shows a second cross section through the illuminating device of FIG. 3.
Figure 5B:
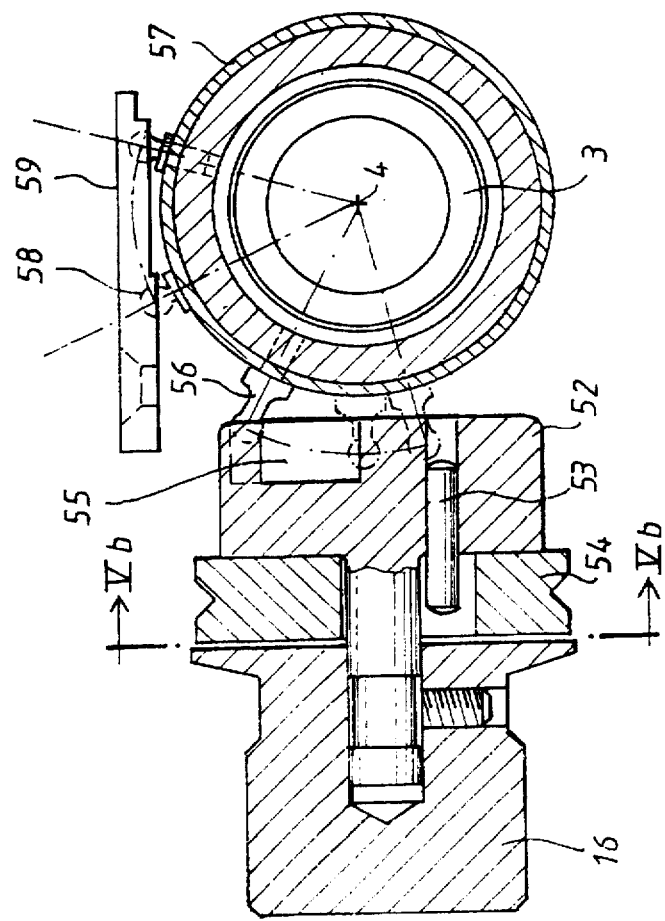

While FIG. 5b is here an enlarged illustration of the corresponding region of the illuminating device in the same perspective as in FIG. 3, a sectional view through the plane delineated in FIG. 5b is shown in FIG. 5a.

A control cam (52), which is driven by the rotary motion of the rotary knob (16), is connected to the rotary knob (16), which is mounted for rotation about its mid-axis (51). An end stop (54) for a stop pin (53) is provided between the rotary knob (16) and the control cam (52), is carried along with the control cam (52) or the rotary knob (16), and limits the rotary movement of the rotary knob (16). A first lug (56) engages in the cam curve (55) of the control cam (52) and transmits the resulting motion to a sleeve (57) as a rotary movement. The two limiting positions of the sleeve movement defined by the cam curve (55) are shown in FIG. 5a, that is, a rotation angle of about 40 degrees results in the embodiment described.

Figure 5C:
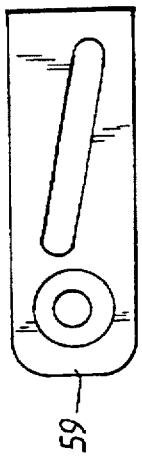
FIG. 5c: shows a portion of the illuminating device of FIGS. 5a and 5b.

The resulting rotary movement of the sleeve (57) is furthermore converted, by means of a second lug (58) which is moved in a linear guide (59), into a defined axial movement of the sleeve (57) in the direction of the optical axis. A plan view of the guide (59) of the second lug (58) is shown in FIG. 5c.

Connected to the sleeve (57) are the iris diaphragm (3) and also the optical elements (5, 6, 7, 8) of the first and second lens groups (L1, L2) which, when the resulting axial movement of the sleeve (57) occurs, move together as a constructional unit relative to the fiber optic light guide.

The iris diaphragm (3) is consequently displaced axially due to the rotary movement of the rotary knob (16), while simultaneously the adjusting pin (60) of the iris diaphragm (3) remains in a fixed radial position in a corresponding guide. Depending on the direction of rotary of the rotary knob (16), there results an opening movement, or else a closing movement, of the iris diaphragm (3).

The third coupling, which has already been mentioned, within the illuminating device according to the invention, is thus also effected by the described mechanism, and by means of it an optimized illumination of the illuminated field diaphragm is ensured for each illuminated field diameter which is set. This takes place, as described, by the variation of the relative distance between the exit face of the light guide and the iris diaphragm (3), in dependence on the diameter of the illuminated field.

Besides the three possibilities of coupling described in the embodiments of FIGS. 3, 4, and 5a–5c, a fourth coupling exists within the illuminating device according to the invention. The illuminated field diameter is hereby further coupled, in an automated manner, to the respectively set magnification of the magnification changing device. A suitable embodiment of a fourth coupling of such a kind is described, to some extent, in German Utility Model G 87 13 356.3, which is incorporated herein by reference.

In addition to the embodiments, cited or described, of the various coupling means, there also exists, as already mentioned, a series of purely mechanical and/or electric motor type of variant couplings, which can all be effected within the scope of the illuminating device according to the invention.

We claim:

1. Illuminating device for a stereo microscope having imaging optics including an objective with variable imaging focal intercepts, comprising:

an optical system separate from said imaging optics for illuminating an object, said optical system providing an illuminating focal intercept variation, said optical system being coupled to said imaging optics such that said illuminating focal intercept is in agreement with said imaging focal intercept of said objective.

2. An illuminating device according to claim 1, further comprising a fiber optic light guide, and at least one illuminated field diaphragm arranged in front of said fiber optic light guide on its exit side, wherein said optical system is arranged in front of said fiber optic light guide on its exit side and has at least one displaceable optical element that is displaceable along an optical axis for adjustment of said illuminating focal intercept.

3. Illuminating device according to claim 2, wherein said optical system includes a first and a second lens group which effect an imaging of said illuminated field diaphragm to infinity, followed by a third and fourth lens group, which effect focusing of said illuminated field diaphragm in an object plane, said third lens group comprising said displaceable optical element.

4. An illuminating device according to claim 2, further comprising a deflecting element following said optical system in a beam propagation direction, said deflecting element being arranged to deflect an illuminating beam path beneath said objective in a direction of an object plane and to deflect said illuminating beam path at different angles relative to an optical axis of imaging beam paths.

5. An illuminating device according to claim 2, further comprising means for varying relative distance between said fiber optic light guide and said illuminated field diaphragm.

6. An illuminating device according to claim 1 in combination with a stereo microscope.

7. Illuminating device for a stereo microscope having imaging optics including an objective with variable imaging focal intercepts, comprising:

an optical system separate from said imaging optics for illuminating an object, said optical system providing an illuminating focal intercept variation, said optical system being coupled to said imaging optics such that said illuminating focal intercept is in agreement with said imaging focal intercept of said objective, a fiber optic light guide, at least one illuminated field diaphragm arranged in front of said fiber optic light guide on its exit side, said optical system being arranged in front of said fiber optic light guide on its exit side and having at least one displaceable optical element that is displaceable along an optical axis for adjustment of said illuminating focal intercept, said optical system including a first and a second lens group which effect an imaging of said illuminated field diaphragm to infinity, followed by a third and fourth lens group, which effect focusing of said illuminated field diaphragm in an object plane, said third lens group comprising said displaceable optical element, said objective comprising displaceable objective elements, and a drive unit for said displaceable objective elements, said first coupling means including a worm and a worm wheel connected thereto, said worm wheel being arranged to be driven by said drive unit to convert rotary motion into an axial motion of said worm wheel, said third lens group of said optical system being connected to said worm wheel.

8. Illuminating device for a stereo microscope having imaging optics including an objective with variable imaging focal intercepts comprising:

an optical system separate from said imaging optics for illuminating an object, said optical system providing an illuminating focal intercept variation, said optical system being coupled to said imaging optics such that said illuminating focal intercept is in agreement with said imaging focal intercept of said objective, a fiber optic light guide, at least one illuminated field diaphragm arranged in front of said fiber optic light guide on its exit side, said optical system being arranged in front of said fiber optic light guide on its exit side and having at least one displaceable optical element that is displaceable along an optical axis for adjustment of said illuminating focal intercept, and a deflecting element following said optical system in a beam propagation direction, said deflecting element being arranged to deflect an illuminating beam path beneath said objective in a direction of an object plane and to deflect said illuminating beam path at different angles relative to an optical axis of imaging beam paths, wherein variable angular position of said deflecting element is coupled to said variable imaging focal intercepts of said objective such that there always exists a defined spatial relationship between a visual field and an illuminated field in said object plane.

9. An illuminating device according to claim 8, further comprising adjusting means for defined adjustment of an illuminated field diameter in said object plane.

10. An illuminating device according to claim 9, wherein said adjusting means includes an iris diaphragm comprising said at least one illuminated field diaphragm with a variable diaphragm opening.

11. An illuminating device according to claim 10, in which said fiber optic light guide is coupled to said illuminated field diaphragm and to said opening of said illuminated field diaphragm such that position of said fiber optic light guide relative to said illuminated field diaphragm and to said diaphragm opening of said illuminated field diaphragm is varied in a defined mutual dependence.

12. An illuminating device according to claim 11, comprising a rotary knob, a control cam connected to said rotary knob, and a sleeve to which said iris diaphragm and said first and second lens groups are connected, and wherein rotary motion of said rotary knob effects a defined axial movement of said sleeve while said fiber optic light guide remains in a defined position, and wherein with axial movement of said sleeve a variation of diameter of said iris diaphragm takes place by keeping constant radial position of said adjusting pin.

13. An illuminating device according to claim 9, further comprising a magnification changing device for a stereo microscope, said illuminated field diameter being coupled to said magnification changing device such that a defined displacement of said illuminated field diameter is effected in dependence on magnification that is set for said magnification changing device.

* * * * *